United States Patent [19]

Osrow

[11] 4,391,575
[45] Jul. 5, 1983

[54] KITCHEN APPLIANCE FOR MAKING FARINACEOUS PRODUCTS

[75] Inventor: Harold Osrow, Dix Hills, N.Y.

[73] Assignee: Osrow Products Corp., Old Bethpage, N.Y.

[21] Appl. No.: 184,351

[22] Filed: Sep. 5, 1980

[51] Int. Cl.³ .............................................. B29B 1/06
[52] U.S. Cl. ..................................... 425/190; 366/77; 366/87; 366/196; 425/464; 425/466
[58] Field of Search ...................... 366/76, 77, 79, 81, 366/87, 91, 96–100, 196, 194, 195, 186; 425/190, 197, 205, 192 R, 463, 464, 466, 382 R, 207, 208; 241/37.5

[56] References Cited

U.S. PATENT DOCUMENTS

| | | | |
|---|---|---|---|
| 3,051,990 | 9/1962 | Peterson | 425/190 |
| 3,281,896 | 11/1966 | Meyer | 425/466 |
| 3,570,659 | 3/1971 | Hartley | 366/196 |
| 3,749,374 | 7/1973 | Buchheit | 366/100 |
| 3,865,528 | 2/1975 | Roess | 425/466 |
| 4,111,372 | 9/1978 | Hicks | 241/37.5 |
| 4,146,333 | 3/1979 | Zani | 366/99 |
| 4,219,318 | 8/1980 | Cavalli | 366/98 |
| 4,255,110 | 3/1981 | Otsuka | 425/466 |

FOREIGN PATENT DOCUMENTS 451958 10/1949 Italy .

Primary Examiner—Robert W. Jenkins
Attorney, Agent, or Firm—Kirschstein, Kirschstein, Ottinger & Cobrin

[57] ABSTRACT

A kitchen appliance for and method of making farinaceous products such as spaghetti, fettucini, macaroni, manicotti, lasagna, pizza crusts, taco shells, bagels, breadsticks and like dough products, use a mixing chamber for receiving the product ingredients, a rotary mixer for mixing the ingredients, a rotary extruder for extruding the mixed ingredients through an extrusion die at a discharge outlet, and a reversible motor drive for jointly turning the rotary mixer and rotary extruder about the same axis of rotation in either circumferential direction. In one direction, only mixing is effected; in the opposite direction, extruding is effected. An arrangement for and method of adjusting the thickness of the extruded farinaceous product are also described.

21 Claims, 9 Drawing Figures

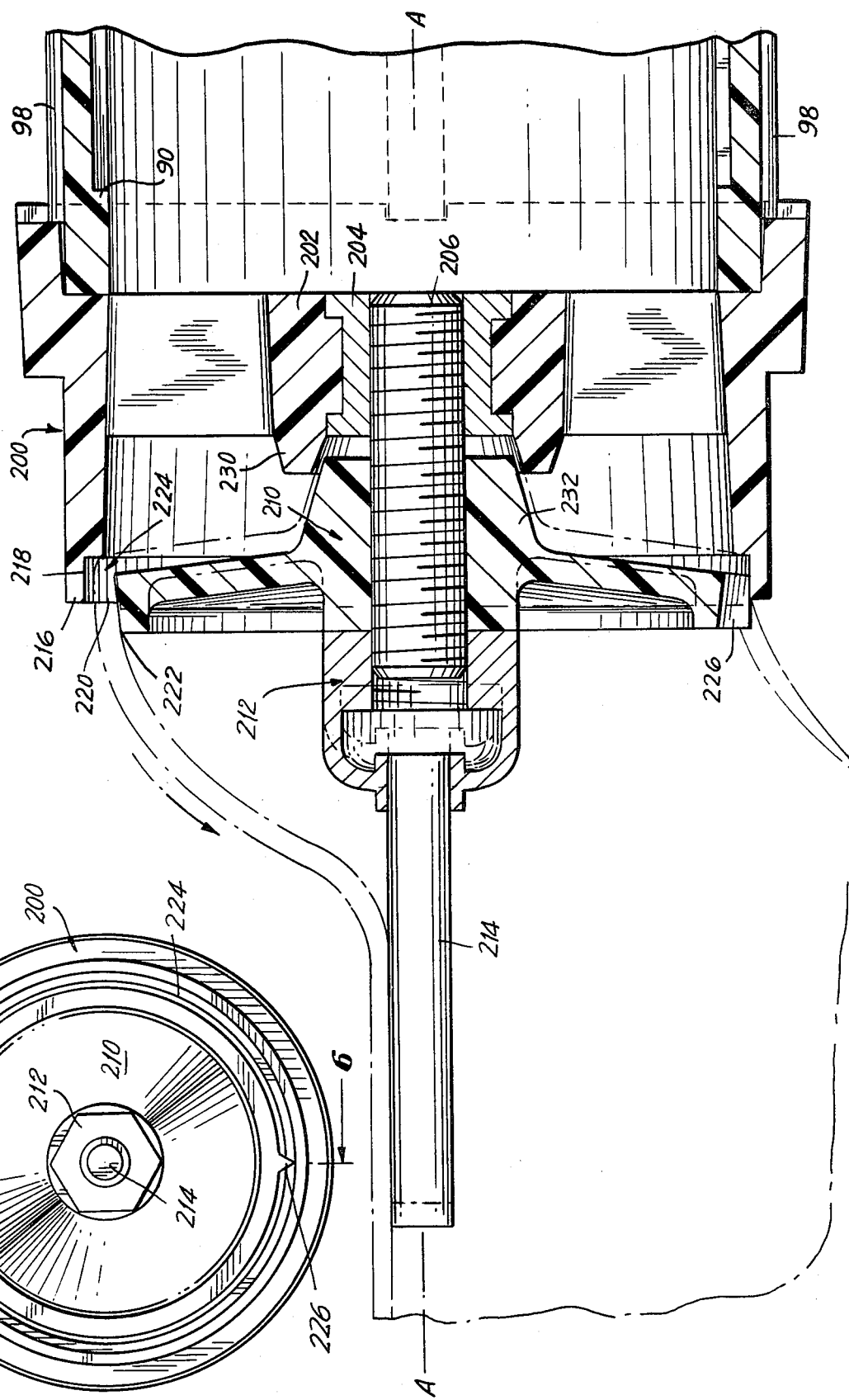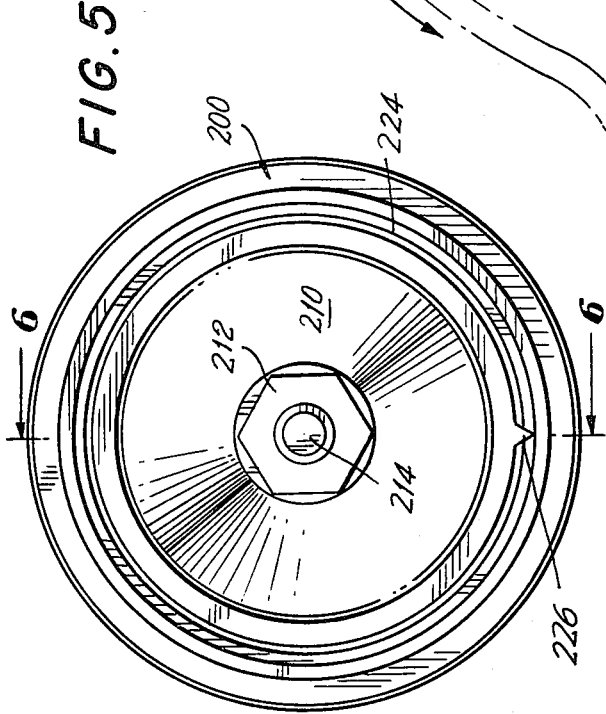

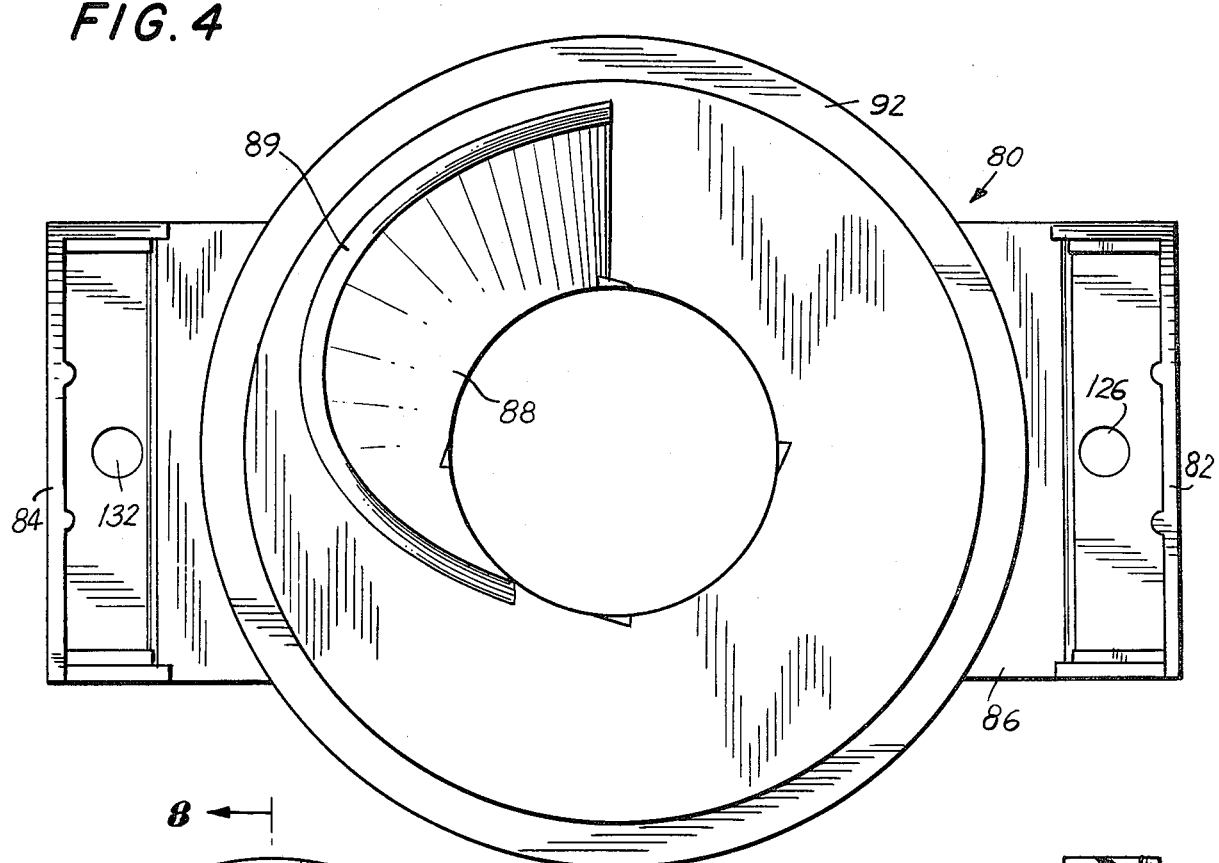
FIG. 4
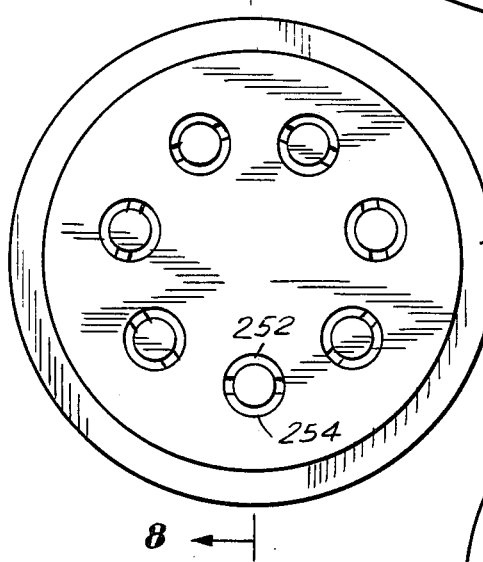
FIG. 7
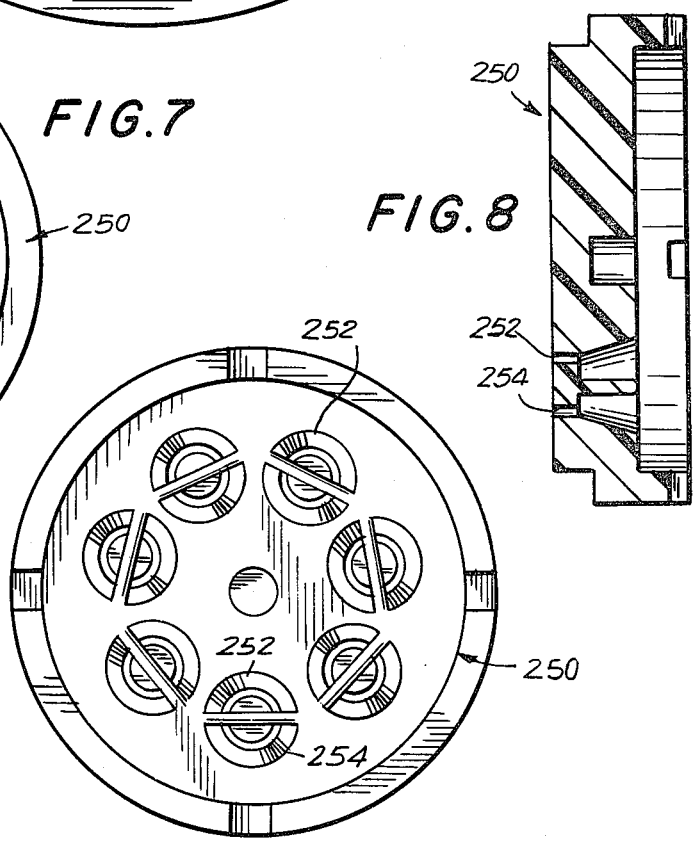
FIG. 8
FIG. 9

KITCHEN APPLIANCE FOR MAKING FARINACEOUS PRODUCTS

BACKGROUND OF THE INVENTION

1. Field of the Invention

This invention generally relates to a kitchen appliance for, and method of, making farinaceous products and, more particularly, for making such foodstuffs as spaghetti, fettucini, macaroni, manicotti, lasagna, pizza crusts, taco shells, bagels, breadsticks and the like products from alimentary pasta or dough.

2. Description of the Prior Art

Industrial and household appliances, e.g. U.S. Pat. No. 4,146,333, are known for kneading and extruding dough to form various farinaceous products. However, the known appliances have not proven to be altogether satisfactory. The usual type of mixer tends to develop accumulations or lumps of dough around the mixer shaft and on the mixer blades. This is undesireable and cannot be disregarded, particularly in a private kitchen where such accumulations use up significant portions of the available flour and other ingredients.

Further, such accumulations tend to impede the proper extrusion of the farinaceous product, especially where low-power motor drives are employed for household appliances. The known appliances must therefore be constantly cleaned—a drawback which is all the more objectionable due to the complex, multipart construction of the prior art appliances.

For example, the mixer and the extruder screw are typically separately rotatable about different axes of rotation. These separate parts must be individually removed from their respective mixing and extruding chambers. This is typically a time-consuming task due to the close quarters of the household appliance.

Moreover, the known household appliances typically use a sliding trap door to separate the mixing and extruding chambers. This is another undesirable aspect, because the trap door requires individual manipulation and cleaning.

Still further, the prior art appliances make only a few of the many farinaceous products available. The known appliances also make no provision for changing the thickness of the extruded product, as desired.

SUMMARY OF THE INVENTION

1. Objects of the Invention

Accordingly, it is the general object of this invention to overcome the aforementioned drawbacks of the prior art.

It is another object of this invention to provide a compact, relatively inexpensive and easy-to-clean household appliance for making a farinaceous product.

An additional object of this invention is to provide a reliable household appliance which mixes and extrudes dough without requiring the manipulation of trap doors.

Yet another object of this invention is to provide a farinaceous product-making device with a minimum number of parts which are readily disassembleable for cleaning purposes, particularly in a dishwasher.

Still another object of this invention is to adjust the thickness of the extruded farinaceous product to a desired value.

An additional object of this invention is to provide a single household appliance which can make solid products such as spaghetti, or tubular products such as noodles, or sheet-like products such as lasagna, or bread products such as bagels by selection of one of a plurality of extrusion dies.

2. Features of the Invention

In keeping with these objects and others which will become apparent hereinafter, one feature of this invention resides, briefly stated, in a kitchen appliance for, and method of, making farinaceous products such as spaghetti, fettucini, macaroni, manicotti, lasagna, pizza crusts, taco shells, bagels, breadsticks and like dough products from alimentary pasta, hereinafter referred to as dough. The appliance has a housing with a mixing chamber for receiving the dough. A mixer mixes the dough, and includes at least one mixer element or paddle fixedly mounted on a mixer shaft, which is journalled in the mixing chamber for rotation about an axis of rotation.

An extruding chamber is axially spaced from the mixing chamber, and an extruder is mounted in the extruding chamber for extruding the mixed dough out through a discharge outlet. The extruder includes an elongated extruder screw which is journalled for rotation about the aforementioned axis of rotation. The extruder screw and the mixer shaft are co-linear and jointly rotatable about the same axis of rotation.

In accordance with this invention, drive means, preferably a reversible electrical motor having an output shaft, is operative to jointly turn the mixer shaft and the extruder screw simultaneously about the axis of rotation. The reversible motor shaft turns the mixer shaft and extruder screw in one circumferential direction to effect only mixing of the dough, and at the user's option, in the opposite circumferential direction to effect further mixing and extrusion of the dough.

The above-described household appliance does not require any manipulation or cleaning of a sliding trap door between the mixing and extruding chambers. By mounting the mixer shaft and the extruder screw on the same axis, and preferably by forming the mixing shaft and extruder screw of one-piece molded plastic construction, the number of parts is kept to a minimum, thereby simplifying the removal of these parts from the housing, as well as the easy cleaning of these parts.

Another feature of this invention is provided in a movable extrusion die arrangement for adjusting the thickness of the extruded dough. This novel feature overcomes the prior art drawback of being restricted to a single predetermined thickness, and also permits the user to make a much larger variety of farinaceous products than heretofore.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a rear view of a detail of the assembly in the direction of the arrows 4—4 of FIG. 2;

FIG. 5 is an enlarged front view of the adjustable die arrangement for the kitchen appliance of FIG. 1, for adjusting the thickness of the farinaceous product;

FIG. 6 is a sectional view of the die arrangement of FIG. 5 as taken on line 6—6 thereof;

FIG. 7 is a front view of one extrusion die used on the kitchen appliance of FIG. 1;

FIG. 8 is a sectional view of the die as taken on line 8—8 of FIG. 1; and

FIG. 9 is a rear view of the extrusion die of FIG. 7.

DETAILED DESCRIPTION OF THE PREFERRED EMBODIMENTS

Figure 1:
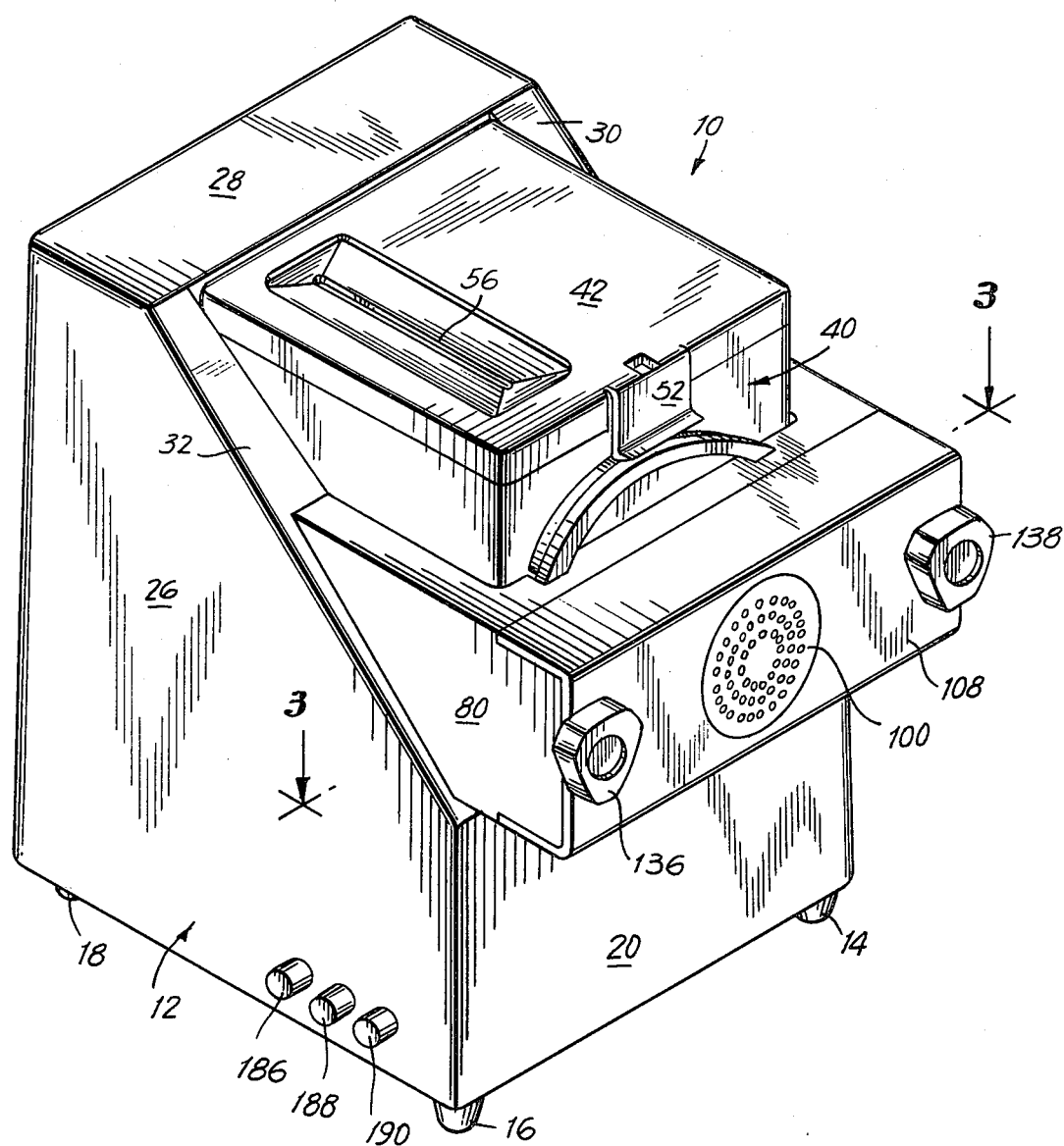
FIG. 1 is a front perspective view of the kitchen appliance for making a selected farinaceous product in accordance with the method of this invention.

Referring now to the drawings, and particularly to FIG. 1 thereof, reference numeral 10 generally identifies a kitchen appliance for making farinaceous products. Such flour-containing products may be narrow, solid and round in cross-section such as spaghetti, or solid and strip-shaped in cross-section such as fettucini, or tubular in cross-section such as macaroni or manicotti, or large flat strips such as lasagna, or thick sheets such as pizza crusts, or thin sheets such as taco shells, or large, solid and round in cross-section such as bagels, pretzels and breadsticks. It will be understood that this invention is not to be limited to the particular types and shapes of farinaceous products just mentioned above, because many other pasta products can be made by this invention. Indeed, it is believed to be self-evident that many other unnamed pasta products can be produced and are expressly intended to be included within the broad definition of the term "farinaceous products," which hereinafter is sometimes referred to as either pasta or dough.

Figure 2:
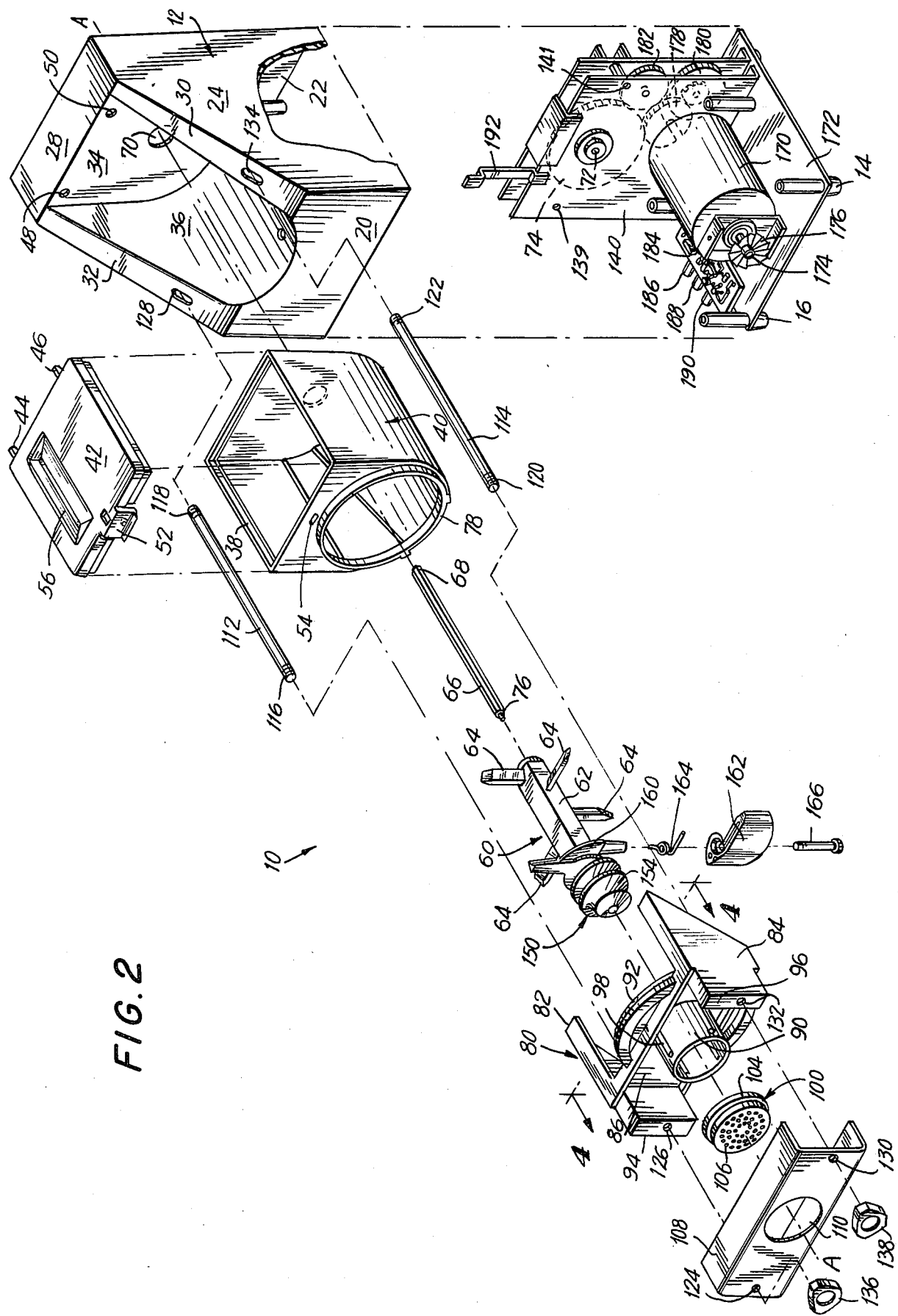
FIG. 2 is an exploded assembly view of the kitchen appliance in FIG. 1.

The appliance 10 comprises an upright plastic housing 12 which is supported by a plurality of feet, e.g. 14, 16, 18. As best shown in FIG. 2, the housing 12 has a front wall 20, a rear wall 22, a pair of side walls 24, 26, a top wall 28, and a pair of sloping walls 30, 32 which extend forwardly from the top wall 28 towards the front wall 20. The housing 12 has a back wall 34 spaced inwardly of the rear wall 22, and a semi-cylindrical base portion 36 located intermediate the sloping walls 30, 32. The interior of the housing 12 underneath the base portion 36 and behind the back wall 34 is hollow, for receiving some of the components of the drive means, as described below.

The back wall 34 and base portion 36 form a housing cavity for supportably receiving a mixing chamber or bowl 40. The bowl 40 is constituted of transparent plastic material and has an upper opening 38 which is closed by a removable transparent plastic cover 42. The cover has a pair of rearwardly-extending guide projections 44, 46 which are respectively guidably received in apertures 48, 50 that are formed in the back wall 34. A snap-type handle 52 is formed on the front of the cover 42 and snappingly engages a top aperture 54 formed in the front wall of the bowl 40. A downwardly tapered filler opening 56 is formed on, and extends through, the top of the cover 42 to permit entry of fluid ingredients such as eggs or water into the interior of the bowl. The flour or solid ingredients of the dough are introduced through the upper opening 38 of the bowl 40 after the cover 42 has been removed therefrom.

Mixer means 60 is provided in the bowl 40 for mixing the dough ingredients. The mixer means 60 includes an elongated mixer shaft 62 mounted in the bowl for rotation about an axis of rotation A—A, and at least one, and preferably a plurality of, mixer elements or blades 64 fixedly mounted on the shaft 62 for joint rotation therewith.

The mixer shaft 62 and the blades 64 are preferably molded of one-piece plastic construction. For strength and mechanical coupling purposes, the plastic shaft 62 is molded about a metallic rod 66 which is centrally located therein and which extends lengthwise along the rotary axis A—A. One end region 68 of the metallic rod 66 has a prismatic head which passes through the aperture 70 in the back wall 34 and which positively fits into the corresponding prismatic recess 72 formed in a speed-reducing gear 74. The opposite end region 76 of the metallic rod 66 extends beyond the plastic shaft 62 and is journalled in a bearing formed at the rear of the extrusion die 100, as explained in greater detail below. The mixer shaft 62 is concentrically mounted within the bowl opening which is formed in the front wall of the bowl 40 and which is bounded by the annular lip 78.

The mixer blades 64 extend in radial direction and are arranged both axially along, and in circumferential direction about, the mixer shaft 62, i.e. along the rotary axis A—A. Each blade is oriented at an angle, e.g. 45°, relative to the rotary axis. Each blade has a truncated, generally pyramidal-type configuration, with a triangular cross-section, for reliably kneading the dough with sufficient strength.

An extruder container 80 is mounted on the housing 12 axially forwardly of the bowl 40. The container 80 comprises a pair of side walls 82, 84 having tapered lower edges which respectively rest on and engage the sloping side walls 32, 30 of the housing 12. The container 80 also has a cross wall 86 extending intermediate the side walls 82, 84. At the front of the cross wall 86 is located a tubular extruding chamber 90; at the rear of the cross wall 86 is located an entry zone or packing chamber 88 (See FIGS. 3 and 4). An annular flange 92 fits over and is concentrically mounted on the annular lip 78 of the bowl 40. The extruding chamber 90 has a cylindrical configuration which extends axially and symmetrically about the rotary axis and which is concentric with the same. A pair of extensions 94, 96 extend forwardly of the side walls 82, 84 at opposite lateral sides of the extruding chamber 90. A plurality of axially-extending alignment ribs 98 are circumferentially arranged about the exterior of the extruding chamber 90. The extruder container 80 is preferably molded of one-piece transparent plastic construction with its walls 82, 84, 86 and its chambers 88, 90 and its flange 92 and its extension 94, 96 and its ribs 98.

Figure 3:
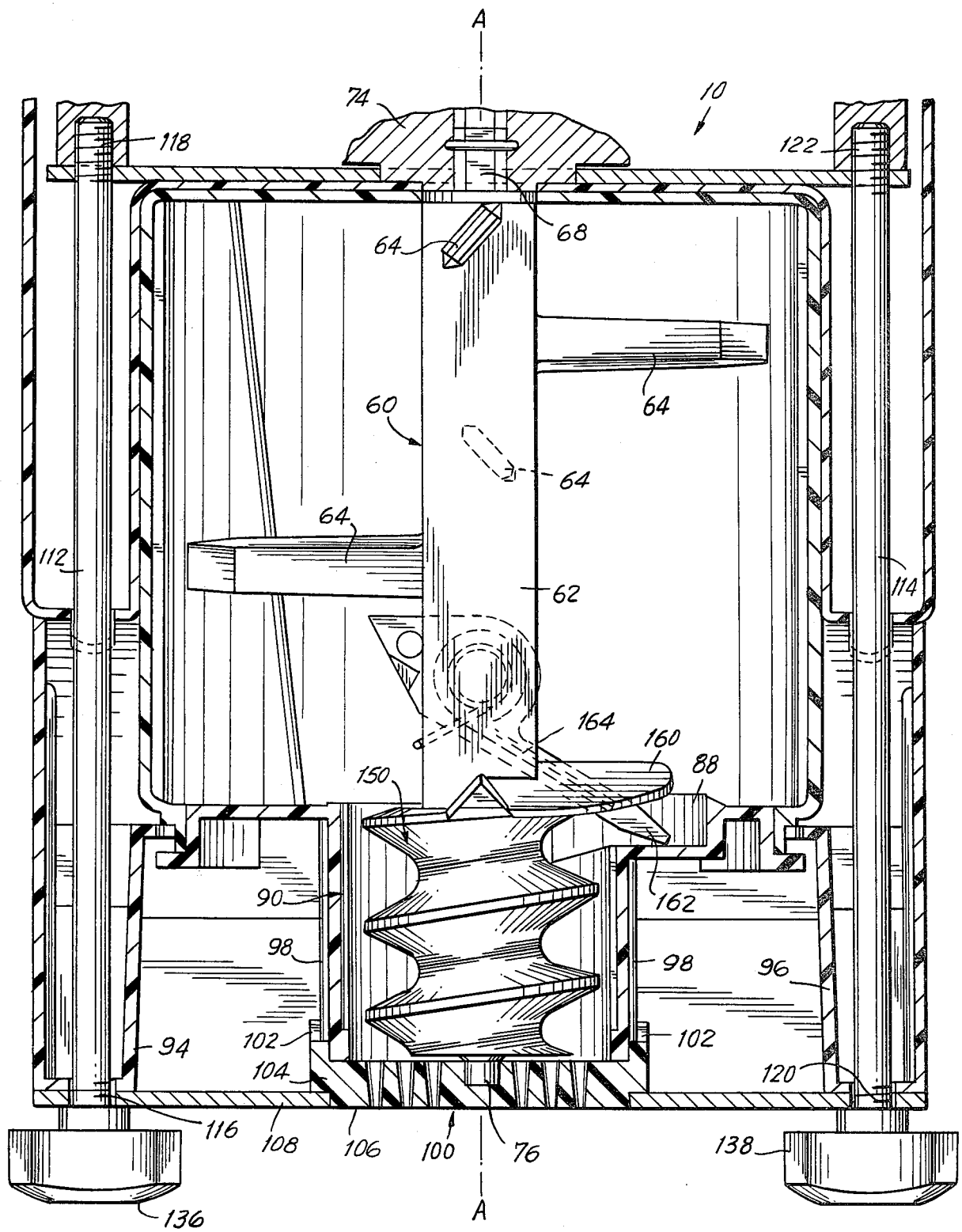
FIG. 3 is a sectional view as taken on line 3—3 of FIG. 1.

An annular extrusion die 100 is mounted over the open axial end of the cylindrical extruding chamber 90. As best shown in FIG. 3, the die 100 has corresponding axially-extending grooves 102 at its rear axial end which frictionally and snugly receive the alignment ribs 98. The die 100 has a larger annular portion 104 and a concentric smaller annular portion 106. A generally U-shaped metallic cover plate 108 having a central circular opening 100 is fitted over the die 100, and is dimensioned such that the smaller annular portion 106 is received in the opening 110, but not the larger annular portion 104, thereby retaining the die 100 on the extruding chamber 90.

A pair of linear extension bolts 112, 114 having pairs of threaded end portions 116, 118 and 120, 122 are used to lock the cover plate 108 to the extending container 80 and, in turn, to the mixing bowl 40, and thereupon, to the housing 12. To this end, bolt 112 successively passes with clearance through the opening 124 on the cover plate, the opening 126 on the extension 94 of the container 80, and the opening 128 on the housing. Similarly, bolt 114 successively passes through the mutually aligned openings 130, 132 and 134. Locking knobs 136, 138 threadedly engage threaded ends 116, 120 of the bolts 112, 114. The opposite threaded ends 118, 122 threadedly engage tapped openings 139, 141 in a support plate 140. The knobs 136, 138 are easily unthreaded from the bolts 112, 114 to permit either quick and easy interchange of the die 100 with another selected die, or quick and easy removal of the extruder container 80 and the mixer bowl 40 from the housing for cleaning purposes.

Extruder means 150 for extruding the mixed ingredients from the die 100 is preferably constituted by an elongated extruder screw which is mounted in the extruding chamber 90 for rotation about the rotary axis A—A. The extruder screw has a shaft portion 152 and a helical thread portion 154. The extruder screw is made of plastic material and is preferably molded of one-piece with the mixer 60 such that the extruder screw shaft portion 152 is co-linear with the mixer shaft 62. This one-piece construction permits the extruder 150 and mixer 60 to be jointly rotatable as a unit in either circumferential direction about the same rotary axis without the need for additional complex gearing. Further, this one-piece construction permits easy removal of the extruder 150 and mixer 60 simultaneously which greatly facilitates cleaning of the appliance and which contributes to the overall simplicity of the construction.

As best shown in FIGS. 3 and 4, the packing chamber 88 is located intermediate, and permits communication between, the mixing chamber 40 and the extruding chamber 90. In contrast to prior art constructions, there are no sliding trap doors to be manipulated to permit communication between the mixing and extruding chambers. The mixed dough within the mixing chamber 40 is conveyed to the packing chamber 88 by stuffing means which is comprised of a stuffing element 160 fixedly mounted on the mixed shaft 62 for joint rotation therewith, and of a spring-loaded doctor blade 162 which is mounted for resiliently yielding movement also on the mixer shaft 62.

The stuffing element 160 extends partially circumferentially about the rotary axis, and is generally sector-shaped. Preferably, the stuffing element 160 is molded of one-piece plastic construction with the mixer 60 and the extruder 150. The stuffing element closely overlies the inner axial end of the packing chamber 88 for each revolution about the rotary axis.

The doctor blade 162 is mounted by spring 164 to the mixer shaft. The doctor blade 162 is a separate molded plastic part which is mounted for joint rotation with the mixer 60 by the bolt 166. The doctor blade 162 extends slightly into the packing chamber 88 for each revolution about the rotary axis.

The packing chamber 88 is generally spiral-shaped and extends both circumferentially at least in part about the rotary axis, and also axially. The cross-section of the packing chamber 88 converges along its extension in direction from the mixing chamber towards the extruding chamber. The doctor blade 162 and the stuffing element 160 convey the mixed dough to the packing chamber 88, and the doctor blade reliably and uniformly packs the mixed dough therein, to facilitate uniform entry of the packed dough into the extruding chamber without undesirable air pockets or lumpy accumulations of dough. A camming ridge 89 partly circumferentially surrounds the packing chamber 88.

Drive means, preferably a reversible electrical motor 170, is mounted on a base plate 172 which underlies the housing 12. The reversible motor 170 is operative for jointly turning the mixer 60 and the extruder 150 simultaneously about the rotary axis in either of two circumferential directions. In one predetermined direction, e.g., clockwise, any dough within the mixing bowl 40 is mixed; and no extrusion of any dough within the extruding chamber 90 occurs. In the opposite predetermined direction, e.g., counter-clockwise, any dough within the extruding chamber 90 is extruded through the die 100; and any dough within the mixing bowl 40 will be further mixed inasmuch as the mixer blades 64 knead the dough in either circumferential direction.

The motor 170 has an output shaft 174 having a cooling fan 176 at one end, and an opposite end which is coupled to a speed reducing gear transmission composed of a set of gears 178, 180, 182. Drive gear 74 has the prismatic recess 72 which couplingly engages the common shaft 66 for the mixer and the extruder unit, for turning the same in the requisite direction about the rotary axis.

In order to manually select the proper operational mode, i.e., mixing or extruding, an electronic sub-circuit is electrically connected to the motor 170. The electronic sub-circuit includes a printed circuit board 184 and a plurality of manually-operated actuators or push-button switches 186, 188, 190, all preferably arranged in a row at the lower region of the housing 12.

The pushbutton switches 186, 188, 190 are interconnected such that the motor shaft turns in the mixing-only direction only when switch 186 is manually operated. and turns in the extruding direction only when both switches 188 and 190 are both manually operated. To this end, switches 186 and 190 are connected in series with each other. Any other combination of operating the switches will not energize the motor.

The just-described manner of actuating the proper combination of switches to select the proper operating mode represents a safety feature for proper operation of the appliance. It is undesirable to extrude the dough before the fluid ingredients thereof have been added therein, or to extrude the dough before it has been uniformly mixed. Hence, by compelling the user to press two switches, rather than one, this additional act serves as a reminder to the user to check whether the fluid ingredients have indeed been added, and whether the dough has indeed been mixed for the recommended amount of time.

One further safety feature is embodied in a safety switch 192 which is controlled by the removable cover 42 to deactivate the motor 170 when that cover has been removed from the mixing bowl 40. The safety switch 192 is located on the support plate 140 and has an armature located behind the opening 48 in the back wall 34 of the housing 12. The switch 192 is electrically connected in series between the incoming power and the motor 170. The switch 192 is normally open.

When the cover 42 is placed on the bowl 40, the guiding projection 44 extends through the aperture 48 and moves the up standing armature of the safety switch 192 so as to close the same and complete the electrical current path to the motor 170. If the cover is removed from the bowl 40, then the projection 44 no longer exerts a force against the armature, thereby returning the safety switch to its normally-open state and deactivating the motor.

The operation of the kitchen appliance can be briefly summarized as follows: The solid ingredients of the dough are fed into the bowl 40, and thereupon, the cover 42 is placed over the bowl opening. Then, the actuator switch 186 is depressed to initiate the mixing mode of operation. At this time, the fluid ingredients of the dough are fed into the bowl through the filler opening 56. The mixer 60 proceeds to mix the dough for a predetermined amount of time on the order of a few minutes for the small-scale quantities of dough involved.

Once the mixing is complete, the user depresses actuator switches 188 and 190 to initiate the extrusion mode. The stuffing element 160 and doctor blade 162 thereupon convey the mixed dough into the packing chamber 88. The doctor blade 162 extends slightly into the packing chamber to uniformly tamp the mixed dough therein, and thereupon rides along the camming ridge 89 until the doctor blade clears the packing chamber.

The extruder 150 urges the mixed dough out through the discharge outlets which are formed in the extrusion die 100. As shown in FIG. 3, a spaghetti-making die is located downstream of the extruder, and the illustrated plurality of discharge outlets converge outwardly of the extruder. Hence, a plurality of long, thin rods of dough of round cross-sections are extruded.

Other dies can be used in substitution for the spaghetti-making die 160 shown in FIGS. 1–3. Instead of circular openings, a plurality of thin, narrow slits of rectangular cross-section can be used to make fettucini. Alternatively, tubular openings can be used to make noodles such as macaroni. Alternatively, a die having a large circular central opening can be used to make a cylindrical rod-shaped mass of dough which can serve as a breadstick, or be fashioned into a pretzel or bagel.

In accordance with another feature of this invention, FIGS. 5 and 6 show an accessory arrangement for adjusting the thickness of the extruded dough. Basically, this arrangement comprises a movable die element which is moved relative to the discharge outlet of the extruding chamber 90 so as to change the cross-sectional dimension of the discharge outlet through which the dough is extruded.

Referring now to FIG. 6, the open tubular end of the extruding chamber 90 is fitted with an annular plastic extension member 200. The extension member has a hub portion 202 which is molded about a metallic insert 204 that is internally threaded. An elongated externally threaded rod 206 is threaded into the insert 204, and extends along the rotary axis outwardly of the extruding chamber 90. An annular die element 210 is mounted on the rod 206 for movement lengthwise of the latter. A positioning member or nut 212 is threadedly mounted on the far end of the rod 206 for infinitely variable, continuous movement therealong. The nut 212 engages the die 210 and serves to position the same at any predetermined spacing relative to the extension member 200. A wooden support rod 214 is connected to the nut 212 to facilitate turning the latter to the desired location on the rod, and also serves to support the extruded dough as explained below.

The outer axial end region of the extension member 200 has a cylindrical lip 216 which has an inner circumferential surface 218 that bounds a circular opening 220 concentric with the rotary axis. This circular opening 220 communicates with the interior of the extruding chamber 90 so that the extruded dough must pass through this circular opening 220. The annular die 210 is received within the circular opening 220; and the exterior circumferential surface 222 of the die 210 bounds a tubular discharge outlet 224 with the inner circumferential surface 218 of the extension member 200. It is the cross-sectional dimension of the tubular discharge outlet 224 which determines the shape of the extruded dough.

For example, if there are no obstructions lying across the tubular discharge outlet 224, then the extruded dough would be shaped as a large, hollow noodle, such as manicotti. As shown in FIGS. 5 and 6, a single radially-extending tooth 226 is located within the tubular discharge outlet 224. The tooth 226 acts as a cutting edge to cut the otherwise tubular extruded dough into a large, flat piece of dough of sheet-like configuration suitable, for example, for lasagna. This invention comprises providing dies analogous to die 210, but with three, nine, eighteen, and thirty-six teeth on each respective die. Such multiple teeth dies provide many more, but narrower sheets of extruded dough.

The extruded dough shown in phantom lines in FIG. 6 may be supported on the wooden rod 214. This is particularly desirable when the large hollow noodle is extruded, or when a single sheet of dough is extruded.

In use, the user merely turns the rod 214 and its nut 212 to selectively position the die 210 to any desired position on the rod 206. The thickness of the extruded dough depends upon the cross-sectional dimension of the tubular discharge outlet 224. It is desirable to prevent the user from making the extruded dough too thin, and therefore, an annular abutment 230 is provided on the extension member 200 to engage a tapered hub extension portion 232. When the hub portion 232 is fully seated within the abutment 230, the tubular discharge opening is set at its narrowest cross-section, typically on the order of 0.030 inches. The adjustable arrangement selectively increases this cross-section to a dimension typically on the order of 0.080 inches.

Another die 250 is shown is FIGS. 7–9 suitable for making flat or slightly curved dough. A plurality of semi-circular pairs of slits (e.g. 252, 254) are circumferentially arranged in an annulus equiangularly about the annular die.

It will be understood that each of the elements described above, or two or more together, may also find a useful application in other types of constructions differing from the types described above.

While the invention has been illustrated and described as embodied in a kitchen appliance for and method of making farinaceous products, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt if for various applications without omitting features that, from the standpoint of prior art, fairly constitute essential characteristics of the generic and specific aspects of this invention and, therefore, such, adaptions should and are intended to be comprehended within the meaning and range of equivalence of the following claims.

What is claimed as new and desired to be protected by Letters Patent is set forth in the appended claims:

1. A kitchen appliance for making farinaceous products such as spaghetti, fettucini, macaroni, manicotti, lasagna, pizza crusts, taco shells, bagels, breadsticks and like dough foodstuffs, comprising:
   (a) a housing having a mixing chamber for receiving the ingredients of a selected farinaceous product to be made, said housing having a bottom wall;
   (b) mixer means for mixing the ingredients, including a mixer shaft mounted in the mixing chamber for rotation about a generally horizontal axis of rotation, and at least one mixer element mounted on the mixer shaft for joint rotation therewith to mix the ingredients;
   (c) an extruding chamber mounted on the housing in axially spaced relationship with the mixing chamber, said housing having a discharge outlet and a bottom wall elevated above the bottom wall of the mixing chamber;
   (d) wall means bounding a feed chamber located intermediate of, and in open communication between, the mixing chamber and the extruding chamber, said feed chamber having a raised entry zone located above said axis of rotation;
   (e) stuffer means mounted on the mixer shaft for joint rotation therewith, and operative for raising the mixed ingredients above said axis of rotation, and for feeding the raised ingredients in metered manner into the raised entry zone for subsequent passage to the extruding chamber;
   (f) extruder means for extruding the mixed ingredients from the discharge outlet, including an extruder screw mounted in the extruding chamber for rotation about said axis of rotation, said extruder screw and said mixer shaft extending co-linearly along, and being jointly rotatable about, said same axis of rotation; and
   (g) drive means for jointly turning the mixer shaft, the stuffer means, and the extruder screw simultaneously about said same axis of rotation in a predetermined circumferential direction to effect mixing only of the ingredients, and at the user's option, in the circumferential direction opposite to the predetermined direction to effect lifting of the mixed ingredients, depositing of the mixed ingredients into the raised entry zone in a metered manner, and extrusion of the farinaceous product to be made through the discharge outlet, said drive means including a reversible electrical motor and actuating means for energizing the motor to turn the mixer shaft and the extruder screw in either one of the predetermined and opposite circumferential directions,
whereby farinaceous products can be made in the kitchen in small-scale quantities.

2. The kitchen appliance as defined in claim 1, wherein said housing has a removable cover mounted on the mixing chamber for giving access to the same; and safety switch means on the housing for deactivating the drive means when the cover has been removed from the mixing chamber.

3. The kitchen appliance as defined in claim 1, wherein said mixer means includes a plurality of radially-extending mixer elements arranged axially along, and in circumferential direction about, the mixer shaft; each mixer element being oriented at an angle relative the axis of rotation.

4. The kitchen appliance as defined in claim 1, wherein said extruder auger, said mixer shaft and said mixer element are of one-piece molded plastic construction.

5. The kitchen appliance as defined in claim 1, wherein said stuffing means includes a resilient doctor blade mounted on the mixer shaft for joint rotation therewith; said doctor blade sweeping past in opposite circumferential direction the entry zone during every rotation of the doctor blade.

6. The kitchen appliance as defined in claim 5, wherein said stuffing means further includes a stuffing element fixedly mounted on the mixer shaft adjacent to the doctor blade, for cooperating with the latter to convey the mixed ingredients into the entry zone.

7. The kitchen appliance as defined in claim 1, wherein the entry zone extends both in circumferential direction about the axis of rotation, and also in axial direction thereof to form a helical-type configuration; said entry zone converging in cross-section along its extension in direction away from the mixing chamber.

8. The kitchen appliance as defined in claim 1, wherein said reversible electric motor has an output shaft, and wherein said actuating means energizes the motor to turn the output shaft in either one of the predetermined and opposite circumferential directions.

9. The kitchen appliance as defined in claim 8, wherein said drive means include speed reducing means operatively connected between the output shaft of the motor and the mixer shaft.

10. The kitchen appliance as defined in claim 8, wherein said actuating means includes a plurality of manually-operated actuators; and means interconnecting the actuators with the motor for energizing the same to turn its output shaft in the predetermined direction when one set of actuators has been manually operated, and in the opposite direction when another different set of actuators has been manually operated; at least one of said sets comprising more than one actuator.

11. The kitchen appliance as defined in claim 1, wherein said extruder means includes a plurality of dies, a selected one of which is mounted on the discharge outlet to make a selected farinaceous product; said dies having passageways of different predetermined configurations extending therethrough.

12. The kitchen appliance as defined in claim 1; and further comprising means on the housing for adjusting the thickness of the extruded farinaceous product to be made.

13. The kitchen appliance as defined in claim 12, wherein said adjusting means includes a die element mounted at the discharge outlet for movement relative thereto, and means for moving the die element in axial direction to a predetermined spacing relative to the discharge outlet, whereby farinaceous products of differing thicknesses are produced.

14. The kitchen appliance as defined in claim 13, and further comprising stop means on said die-moving means for setting the die element at an initial spacing relative to the discharge outlet.

15. The kitchen appliance as defined in claim 14, wherein said die-moving means includes an extension member mounted on the extruding chamber in axial relationship therewith; an elongated threaded rod mounted on the extension member and extending lengthwise along the axis of rotation, said die element being mounted on the threaded rod for movement lengthwise of the latter; and a positioning member threadedly mounted on the threaded rod for infinitely variable continuous movement therealong, and engaging said die element to position the same at said predetermined spacing.

16. The kitchen appliance as defined in claim 15, wherein said stop means includes abutment means on said extension member, said abutment means engaging the die element when the latter is spaced at said initial spacing.

17. The kitchen appliance as defined in claim 16, wherein said abutment means is an annular projection concentric with the axis of rotation.

18. The kitchen appliance as defined in claim 15, wherein said extension member has an annular axial end opening within which an annular die element is received with clearance, the outer peripheral surface of the die element and the inner circumferential surface of the extension member opening being spaced apart at said predetermined spacing to form a tubular clearance through which passes an extruded farinaceous product of tubular cross-section.

19. The kitchen appliance as defined in claim 15, wherein said extension member has an annular axial end opening within which an annular die element having at least one cutting edge is received with clearance, the outer peripheral surface of the die element and the inner circumferential surface of the extension member opening being spaced apart at said predetermined spacing to form a tubular clearance through which passes an extruded farinaceous product of sheet-like configuration, said cutting edge extending radially at least partly across the tubular clearance, for cutting the farinaceous product during its passage through the tubular clearance.

20. The kitchen appliance as defined in claim 19, wherein said annular die element has a plurality of radially-extending cutting edges arranged circumferentially about the axis of rotation.

21. The kitchen appliance as defined in claim 15; and further comprising means on the housing for supporting the farinaceous product after discharge from the discharge outlet.

* * * * *